(12) United States Patent
Chen et al.

(10) Patent No.: US 8,708,500 B2
(45) Date of Patent: Apr. 29, 2014

(54) PROJECTION DEVICE FOR EFFECTIVELY PERFORMING THE LIGHT UTILIZATION

(75) Inventors: Cheng-Huan Chen, Longtan/Taoyuan County (TW); Sheng-Hsun Hsieh, Kaohsiung (TW)

(73) Assignee: National Tsing Hua University, Hsinchu (TW)

( * ) Notice: Subject to any disclaimer, the term of this patent is extended or adjusted under 35 U.S.C. 154(b) by 225 days.

(21) Appl. No.: 13/408,800

(22) Filed: Feb. 29, 2012

(65) Prior Publication Data
US 2013/0222769 A1   Aug. 29, 2013

(51) Int. Cl.
*G03B 21/14*   (2006.01)

(52) U.S. Cl.
USPC ............... 353/20; 353/31; 353/34; 353/97; 349/9

(58) Field of Classification Search
USPC ............ 353/7, 8, 20, 31, 33, 34, 37, 94, 97; 349/5, 7, 8, 9; 359/464, 465; 348/58
See application file for complete search history.

(56) References Cited

U.S. PATENT DOCUMENTS

| | | | | |
|---|---|---|---|---|
| 6,961,179 B2* | 11/2005 | Chen et al. | ............... | 359/485.04 |
| 7,241,014 B2* | 7/2007 | Lippey et al. | ..................... | 353/8 |
| 8,011,791 B2* | 9/2011 | Hsiung et al. | .................. | 353/84 |
| 2002/0191235 A1* | 12/2002 | O'Connor et al. | ................ | 359/9 |
| 2009/0051878 A1* | 2/2009 | Hsu et al. | .......................... | 353/8 |

* cited by examiner

*Primary Examiner* — William C Dowling

(57) ABSTRACT

A projection device capable of effectively performing the light utilization is disclosed, particularly comprising polarized beam components and reflective components regarded for controlling polarizing of light, reducing light missing during light transferring from a light source to a projection lens set, increase light utilization efficiency, wherein the polarizing beam components are regarded for separating the light into two orthogonal polarization waves; the present invention further comprises two modulated diaphragms regarded for controlling the strength of said two orthogonal polarization waves, equaling brightness of the polarization waves at final vision, keeping a good quality in final vision.

16 Claims, 6 Drawing Sheets

PROJECTION DEVICE FOR EFFECTIVELY PERFORMING THE LIGHT UTILIZATION

BACKGROUND OF THE INVENTION

1. Field of the Invention

The present invention relates to a projection device capable of effectively performing the light utilization, and more particularly to utilize polarized beam components and reflective components to control the light polarization such that the dissipation and attenuation of light can be further reduced during the transmission process to enhance the utilization efficiency of light.

2. Description of the Related Art

A light emitting diode (LED) is a semiconductor component. Since LEDs have advantages of high efficiency and long service life, currently the LEDs are widely applied in many different fields. For example, the LED can be applied to a projection display device to provide a light source required for projection.

With respect to a conventional projection display device, to reduce etendue effect and effectively utilize the light source, a polarization conversion system (PCS) is disposed inside the conventional projection display device. The PCS is also called beam splitting component that is divided into a reflective PCS and absorption PCS for converting beam polarization direction into S-wave or P-wave so as to increase the light utilization.

With reference to FIG. 1 for a schematic diagram of a light source device of conventional projection equipment is depicted. As shown in FIG. 1, the light source device 1' divides a non-polarized beam emitted by a light source emitter E' into two polarized beams L1', L2' that are perpendicular to each other. The light source device 1' includes a polarized beam splitting component 11', two reflective micro-displays 12', 13', an illumination lens set 14' and a projection lens set 15'. When the light source emitter E' emits the non-polarized beam L', the non-polarized beam L' is concentrated by the illumination lens set 14' to reach the polarized beam splitting component 11'. At this time, the non-polarized beam L' is divided by the polarized beam splitting component 11' into two polarized beams L1', L2' that are perpendicular to each other. Next, the two polarized beams L1', L2' are respectively projected to the two reflective micro-displays 12', 13' and reflected through the polarity of the two reflective micro-displays 12', 13', wherein the polarized beam L1' directly passes through the polarized beam splitting component 11' to reach the projection lens set 15'. The polarized beam L2' is reflected to the projection lens set 15' through the polarized beam splitting component 11'. Finally, the two polarized beams are projected to form images via the projection lens set 15'.

With the foregoing depiction, the structural design of the light source device 1' is quiet simple, and the light source device 1' has the following advantages:

1. The light source device 1' utilizes the polarized beam splitting component 11' to polarize and convert the beam polarization direction so as to increase the light utilization.
2. In addition, the non-polarized beam L' is divided into the two polarized beams L1', L2' that are perpendicular to each other and transmitted via two different paths and outputted to the projection lens set 15' for projecting and imaging. Such the foregoing manner does not only control the beam strengths of two paths, but also control the polarization state of beams at two paths simultaneously. By incorporating a liquid crystal shutter glasses, a stereoscopic effect can be achieved for visual perception of a viewer.

The foregoing technique still has the following shortcomings although the light source device 1' has many advantages.

(A) Low light utilization: to reduce etenude effect and effectively use the light source, the conventional projection display device is realized by the beam splitting components. However, in actual operating, the beam is not really and completely polarized after passing through the beam splitting components. Consequently, the light utilization is absolutely low. Further, no additional room for disposing a beam polarized purification component between the beam splitting component and the reflective micro-displays of the conventional projection display can offset the beam that is not completely polarized yet. Although there are additional rooms to dispose beam polarized purification component, its optical property is also influenced by incident angles. Thus the uniformity of the illumination is affected well; and (B) The brightness of polarized beams at different paths is unable to be controlled. As shown in FIG. 1, the beam is divided into the polarized beams L1', L2' at different paths after entering the polarized beam splitting component. The two polarized beams may have difference on strength due to quality of the beam splitting components and the lens sets. The expression of final stereoscopic imaging may be influenced as well.

Therefore, for a light source device of conventional projection equipment, the foregoing shortcomings must be overcome to effectively perform the light utilization, and the beam strength at different paths can also be regulated.

SUMMARY OF THE INVENTION

In view of the shortcomings of the prior art, the inventor(s) of the present invention based on years of experience in the related industry to conduct extensive researches and experiments, and finally developed a projection device capable of effectively performing the light utilization as a first objective to improve the conventional light utilization. A projection device is disposed by utilizing character of polarized beam components such that the light utilization can be effectively performed to further save energy resource.

According to a second objective of the invention, a projection device capable of effectively performing the light utilization is provided to regulate the strength of different beam paths upon demands. By controlling a modulated diaphragm set, the beam strength with different paths can be regulated such that the beam strength can be balanced during the imaging, and excellent imaging quality of images can be remained.

To achieve the first objective and the second objective of the invention, the projection device capable of effectively performing the light utilization according to the invention is disposed between a light source and a projection lens set and includes a first polarized beam component capable of receiving a non-polarized beam provided by the light source; a first reflecting mirror correspondingly disposed with the first polarized beam component; a second reflecting mirror correspondingly disposed with the first polarized beam component, and the second reflecting mirror diagonally disposed with the first reflecting mirror; a second polarized beam component diagonally disposed with the first polarized beam component; a third polarized beam component disposed to one side of the second polarized beam component, and the third polarized beam component correspondingly disposed with the first reflecting mirror; a fourth polarized beam component disposed to one side of the second polarized beam component, and the fourth polarized beam component correspondingly disposed with the second reflecting mirror, and the fourth polarized beam component diagonally disposed with the third polarized beam component; at least two reflective components comprising a first reflective component and a second reflective component, wherein the first reflective component is opposite to the first reflecting mirror, and disposed to one side of the third polarized beam component; and the second reflective component is opposite to the second polarized beam component, and disposed to one side of the fourth polarized beam component; at least two modulated diaphragm sets comprising a first modulated diaphragm set and a second modulated diaphragm set, wherein the first modulated diaphragm set is disposed between the first reflecting mirror and the third polarized beam component, and the second modulated diaphragm set is disposed between the second reflecting mirror and the fourth polarized beam component.

When the non-polarized beam is irradiated to the first polarized beam component, the non-polarized beam is divided into a first polarized beam and a second polarized beam that are perpendicular to each other, so that, the first polarized beam is remained with an original beam path direction and irradiated to the first reflecting mirror, and the second polarized beam is reflected by the first polarized beam component and irradiated to the second reflecting mirror along a direction that is perpendicular to the original beam path direction.

The first polarized beam irradiated to the first reflecting mirror is reflected by the first reflecting mirror and irradiated to the third polarized beam component through the first modulated diaphragm set, and the second polarized beam irradiated to the second reflecting mirror is reflected by the second reflecting mirror and irradiated to the fourth polarized beam component through the second modulated diaphragm set.

The first polarized beam irradiated to the third polarized beam component directly passes through the third polarized beam component and is irradiated to the first reflective component, thus, the first reflective component changes a polarity of the first polarized beam and reflects the first polarized beam back to the third polarized beam component, such that, the first polarized beam is reflected by the third polarized beam component and irradiated to the second polarized beam component.

The second polarized beam irradiated to the fourth polarized beam component is reflected by the fourth polarized beam component and irradiated to the second reflective component, thus, the second reflective component changes a polarity of the second polarized beam and reflects the second polarized beam back to the fourth polarized beam component, such that, the second polarized beam directly passes through the fourth polarized beam component and is irradiated to the second polarized beam component.

The first polarized beam irradiated to the second polarized beam component is reflected by the second polarized beam component, and the second polarized beam irradiated to the second polarized beam component directly passes through the second polarized beam component, so that, the first polarized beam and the second polarized beam are converged together and irradiated to the projection lens set, then an image is able to be displayed by the projection lens set.

DETAILED DESCRIPTION OF THE PREFERRED EMBODIMENTS

The foregoing and other technical characteristics of the present invention will become apparent with the detailed description of the preferred embodiments and the illustration of the related drawings.

First Embodiment

Figure 1:
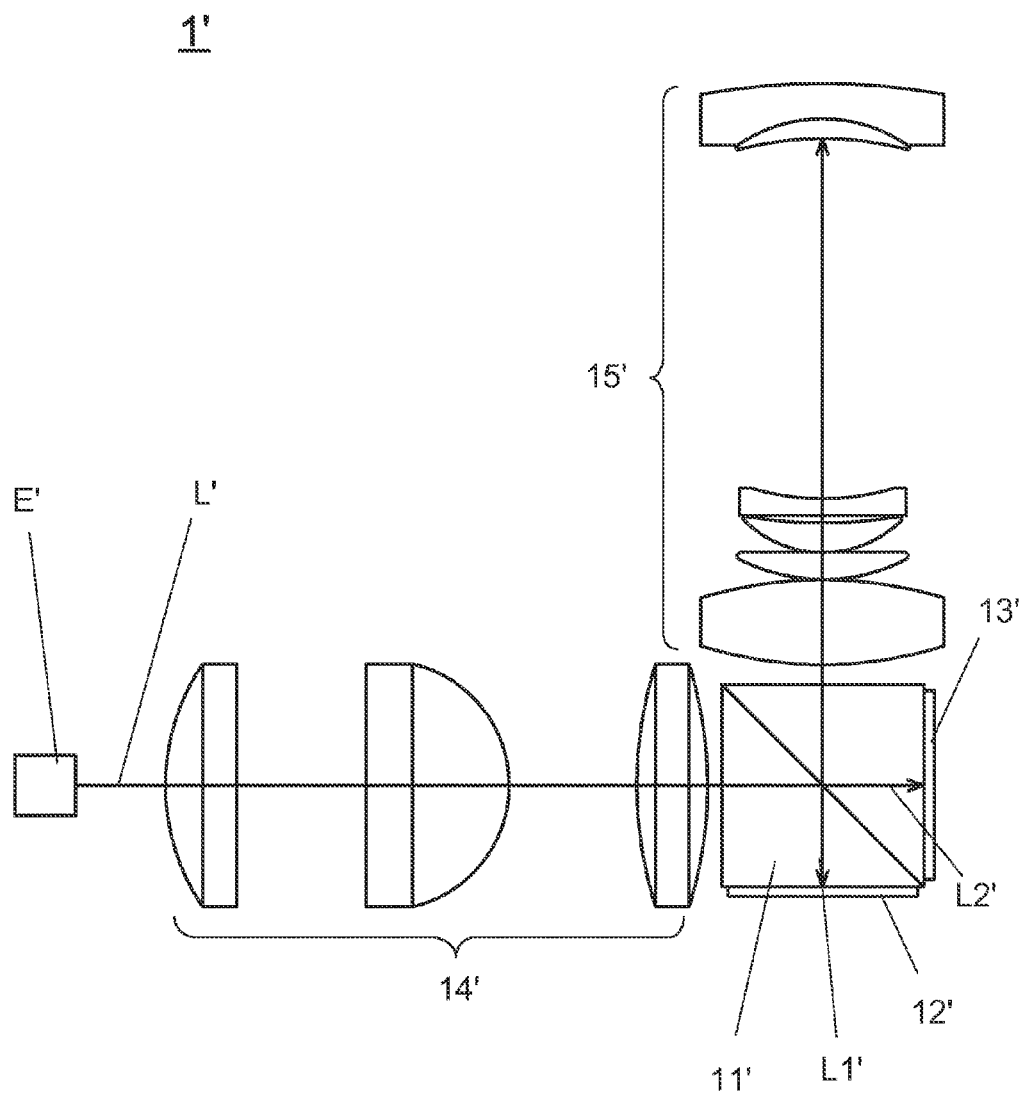
FIG. 1 is a schematic diagram of a light source of conventional projection equipment.
Figure 2:
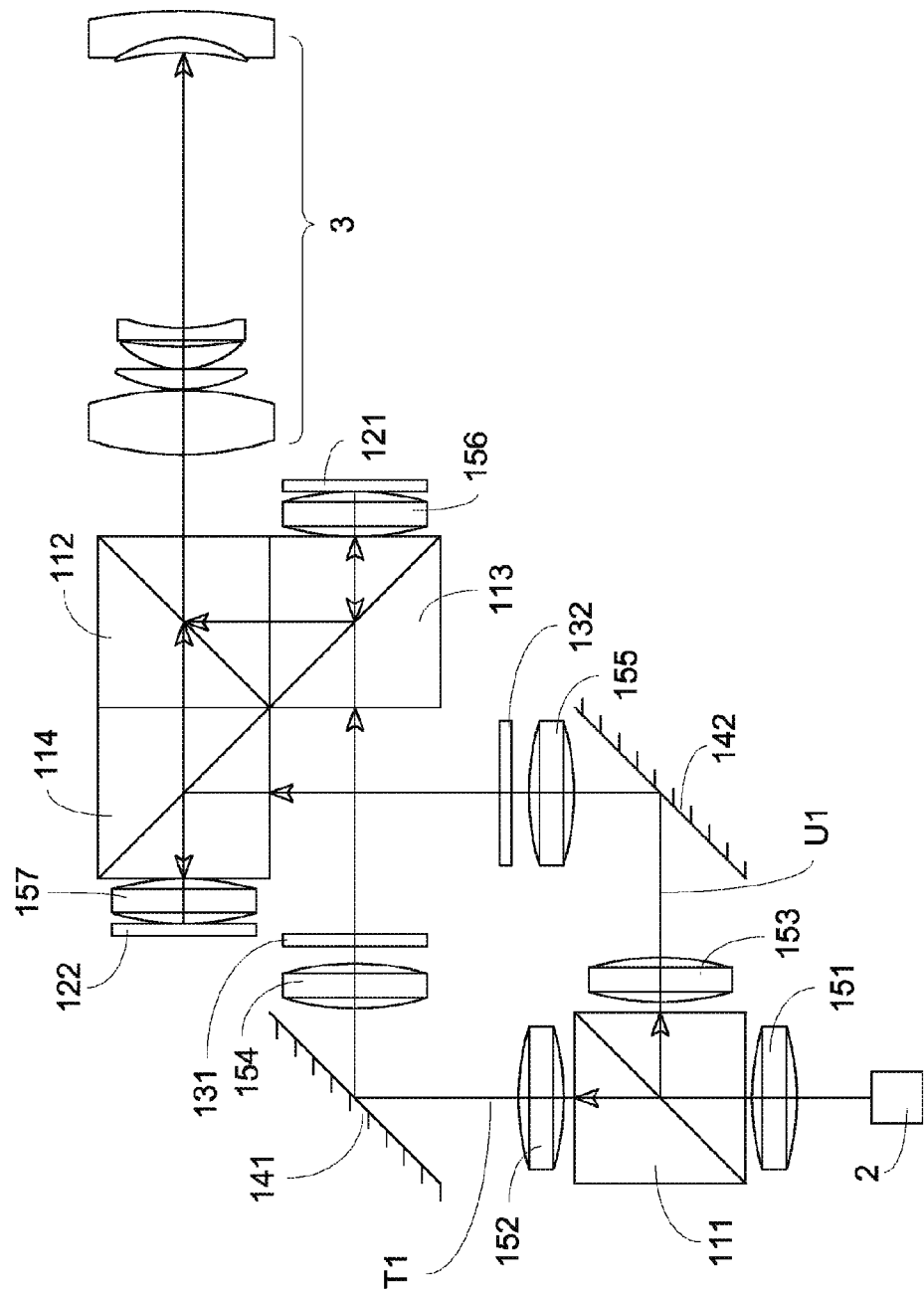
FIG. 2 is a projection device capable of effectively performing the light utilization according to a first embodiment of the invention.

First of all, basic components according to a first embodiment of the invention are introduced. With reference to FIG. 2 for a projection device capable of effectively performing the light utilization according to a first embodiment of the invention is depicted. The projection device capable of effectively performing the light utilization is disposed between a light source 2 and a projection lens set 3, and realized by four polarized beam component, wherein the projection device includes a first polarized beam component 111 for receiving a non-polarized beam provided by the light source 2 and dividing the non-polarized beam into a first polarized beam T1 and a second polarized beam U1; a first reflecting mirror 141 correspondingly disposed with the first polarized beam component 111; a second reflecting mirror 142 correspondingly disposed with the first polarized beam component 111, and the second reflecting mirror 142 diagonally disposed with the first reflecting mirror 141; a second polarized beam component 112 diagonally disposed with the first polarized beam component 111; a third polarized beam component 113 disposed to one side of the second polarized beam component 112, and the third polarized beam component 113 correspondingly disposed with the first reflecting mirror 141; a fourth polarized beam component 114 disposed to one side of the second polarized beam component 112, and the fourth polarized beam component 114 correspondingly disposed with the second reflecting mirror 142, and the fourth polarized beam component 114 diagonally disposed with the third polarized beam component 113.

In addition, to accomplish the first embodiment of the invention, the projection device further have two reflective components comprising a first reflective component 121 and a second reflective component 122, wherein the first reflective component 121 is opposite to the first reflecting mirror 141, and disposed to one side of the third polarized beam component 113; and the second reflective component 122 is opposite to the second polarized beam component 112, and disposed to one side of the fourth polarized beam component 114; and at least two modulated diaphragm sets comprising a first modulated diaphragm set 131 and a second modulated diaphragm set 132, wherein the first modulated diaphragm set 131 is disposed between the first reflecting mirror 141 and the third polarized beam component 113, and the second modulated diaphragm set 132 is disposed between the second reflecting mirror 142 and the fourth polarized beam component 114.

The first embodiment of the invention further has seven sets of lens sets capable of reducing the dissipation of polarized light during the projecting process. The lens sets include a first lens set 151 disposed between the first polarized beam component 111 and the light source 2; a second lens set 152 disposed between the first polarized beam component 111 and the first reflecting mirror 141; a third lens set 153 disposed between the first polarized beam component 111 and the second reflecting mirror 142; a fourth lens set 154 disposed between the first reflecting mirror 141 and the third polarized beam component 113; a fifth lens set 155 disposed between the second reflecting mirror 142 and the fourth polarized beam component 114; a sixth lens set 156 disposed between the third polarized beam component 113 and the first reflective component 121; and a seventh lens set 157 disposed between the fourth polarized beam component 114 and the second reflective component 122.

In the present invention, the first polarized beam component 111, the second polarized beam component 112, the third polarized beam component 113, and the fourth polarized beam component 114 are a polarizing beam splitter (PBS) that utilizes surface coating technique such that two kinds of polarized light respectively generate two different optical behaviors having transmittance or reflection while passing through components. The first reflective component 121 and the second reflective component 122 are reflective liquid crystal micro-displays having liquid crystal on silicon. The modulated diaphragm sets are able to adjust luminous flux of the first polarized beam T1 and the second polarized beam U1.

The process of projecting polarized beam in the first embodiment of the invention is introduced as the following. With reference to FIG. 2, firstly, the illumination beam path according to the first embodiment of the invention is introduced. When the non-polarized beam is irradiated to the first polarized beam component 111, the non-polarized beam is divided into a first polarized beam T1 and a second polarized beam U1 that are perpendicular to each other, then, the first polarized beam T1 is remained with an original beam path direction and irradiated to the first reflecting mirror 141, and the second polarized beam U1 is reflected by the first polarized beam component 111 and irradiated to the second reflecting mirror 142 along a direction that is perpendicular to the original beam path direction.

Next, the first polarized beam T1 irradiated to the first reflecting mirror 141 is reflected by the first reflecting mirror 141 and irradiated to the third polarized beam component 113 through the first modulated diaphragm set 131, and the second polarized beam U1 irradiated to the second reflecting mirror 142 is reflected by the second reflecting mirror 142 and irradiated to the fourth polarized beam component 114 through the second modulated diaphragm set 132.

The first polarized beam T1 irradiated to the third polarized beam component 113 directly passes through the third polarized beam component 113 and is irradiated to the first reflective component 121, thus, the first reflective component 121 changes a polarity of the first polarized beam T1 and reflects the first polarized beam T1 back to the third polarized beam component 113, such that, the first polarized beam T1 is reflected by the third polarized beam component 113 and irradiated to the second polarized beam component 112.

The second polarized beam U1 irradiated to the fourth polarized beam component 114 is reflected by the fourth polarized beam component 114 and irradiated to the second reflective component 122, thus, the second reflective component 122 changes a polarity of the second polarized beam U1 and reflects the second polarized beam U1 back to the fourth polarized beam component 114, such that, the second polarized beam U1 directly passes through the fourth polarized beam component 114 and is irradiated to the second polarized beam component 112.

Afterward the projection beam path according to the first embodiment of the invention is introduced, the first polarized beam T1 irradiated to the second polarized beam component 112 is reflected by the second polarized beam component 112, and the second polarized beam U1 irradiated to the second polarized beam component 112 directly passes through the second polarized beam component 112, so that, the first polarized beam T1 and the second polarized beam U1 are converged together and irradiated to the projection lens set 3, then an image is able to be displayed by the projection lens set 3.

Second Embodiment

Figure 3:
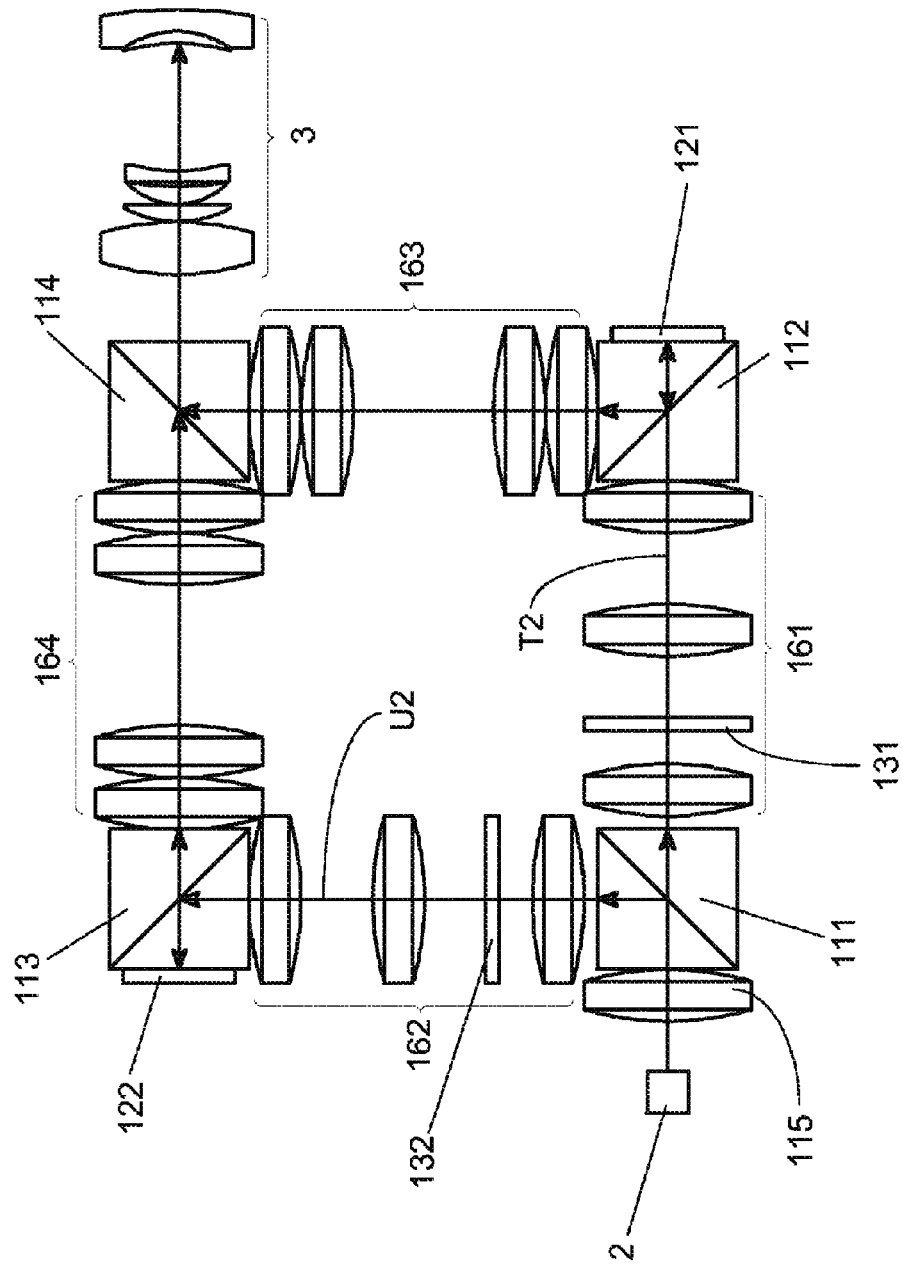
FIG. 3 is a projection device capable of effectively performing the light utilization according to a second embodiment of the invention.

Referring to FIG. 3, there is illustrated a projection device capable of effectively performing the light utilization according to a second embodiment of the invention. The projection device capable of effectively performing the light utilization according to a second embodiment of the invention is disposed between a light source 2 and a projection lens set 3, wherein the projection device includes a first polarized beam component 111 capable of receiving non-polarized light provided by the light source 2 and the non-polarized light into a first polarized light T2 and a second polarized light U2; a second polarized beam component 112 correspondingly disposed with the first polarized beam component 111; and a third polarized beam component 113 correspondingly disposed with the first polarized beam component 111. At the same time, the third polarized beam component 113 is also diagonally disposed with the second polarized beam component 112. Further, the device also has a fourth polarized beam component 114 correspondingly disposed with the second polarized beam component 112 and the third polarized beam component 113 at the same time.

In addition, to accomplish the second embodiment of the invention, the projection device further have two reflective components having a first reflective component 121 and a second reflective component 122, wherein the first reflective component 121 is disposed to one side of the second polarized beam component 112, and the second reflective component 122 is disposed to one side of the third polarized beam component 113. Two modulated diaphragm sets included a first modulated diaphragm set 131 and a second modulated diaphragm set 132 are provided, wherein the first modulated diaphragm set 131 is disposed between the first polarized beam component 111 and the second polarized component 112. The second modulated diaphragm set 132 is disposed between the first polarized beam component 111 and the third polarized beam component 113. An incident lens 115 is disposed to a side of the first polarized beam component 111.

The second embodiment of the invention further has four sets of lens sets capable of reducing the dissipation of polarized light during the projecting process. The lens sets include an eighth lens set 161 disposed between the first polarized beam component 111 and the second polarized beam component 112; a ninth lens set 162 disposed between the first polarized beam component 111 and the third polarized beam component 113; a tenth lens set 163 disposed between the second polarized beam component 112 and the fourth polarized beam component 114; and an eleventh lens set 164 disposed between the third polarized beam component 113 and the fourth polarized beam component 114.

The process of projecting polarized beam in the second embodiment of the invention is introduced as the following. With reference to FIG. 3, firstly, the illumination beam path according to the first embodiment of the invention is introduced. After the non-polarized beam is illuminated the first polarized beam component 111, the non-polarized beam is divided into a first polarized beam T2 and a second polarized beam U2 that are perpendicular to each other. The first polarized beam T2 is S polarized beam. The second polarized beam U2 is P polarized beam. At this time, the first polarized beam T2 is remained with beam path direction and irradiated to the second polarized beam component 112 through the first modulated diaphragm set 131 and the eighth lens set 161. Simultaneously, the second polarized beam U2 is irradiated to the third polarized beam component 113 along a direction that is perpendicular to the original beam path direction through the second modulated diaphragm set 132 and the ninth lens set 162.

Next, the polarization conversion process of the polarized light according to the second embodiment of the invention is introduced, wherein the first polarized beam T2 irradiated to the second polarized beam component 112 directly passes through the second polarized beam component 112 and is able to be irradiated to the first reflective component 121. Thus, the first reflective component 121 changes the polarity of the first polarized beam T2 to become P polarized beam, and the first polarized beam T2 can be reflected to the second polarized beam component 112. The second polarized beam component 112 instantly reflects the first polarized beam T2 such that it can be irradiated to the fourth polarized beam component 114 through the tenth lens set 163.

The second polarized beam U2 irradiated to the third polarized beam component 113 is reflected by the third polarized beam component 113 and irradiated to the second reflective component 122. At this time, the second reflective component 122 instantly reflects the second polarized beam U2 and changes its polarity to become S polarized beam such that the second polarized beam U2 passes through the third polarized beam component 113 to be further irradiated to the fourth polarized beam component 114 through the eleventh lens set 164.

Afterward the projection beam path according to the second embodiment of the invention is introduced, wherein the first polarized beam T2 irradiated to the fourth polarized beam component 114 is reflected by the fourth polarized beam component 114. The second polarized beam U2 irradiated to the fourth polarized beam component 114 directly passes through the fourth polarized beam component 114. Finally, the first polarized beam T2 and the second polarized beam U2 are converged together and irradiated to the projection lens set 3, then an image displayed by the projection lens set 3.

Figure 4A:
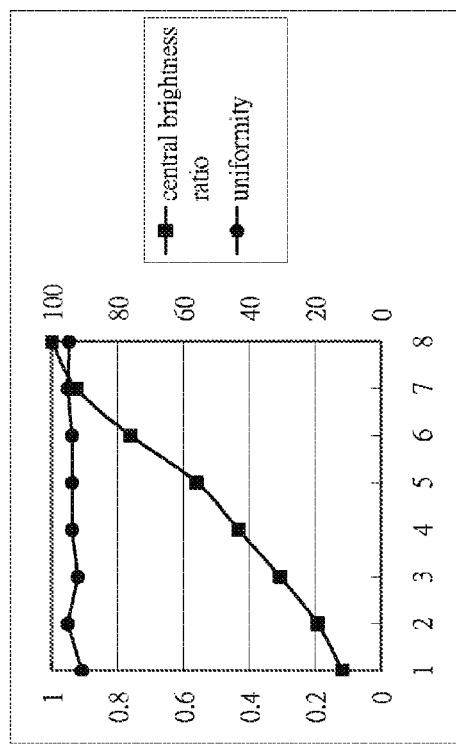
FIG. 4A is a result that uses ZEMAX to simulate a size opened or closed by different modulated diaphragm sets of the projection device capable of effectively performing the light utilization according to the invention.
Figure 4B:
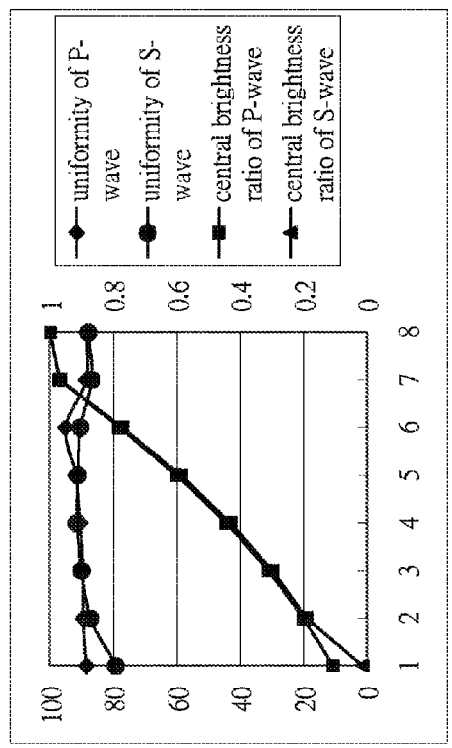
FIG. 4B is a result that uses ASAP to simulate a size opened or closed by different modulated diaphragm sets of the projection device capable of effectively performing the light utilization according to the invention.

With reference to FIG. 4A and FIG. 4B for a result that uses ZEMAX and ASAP to simulate a size opened or closed by different modulated diaphragm sets of the projection device capable of effectively performing the light utilization according to the invention are depicted, wherein ZEMAX and ASAP are optical design software. The ZEMAX shows uniformity and central brightness ratio of beam regarding the modulated diaphragm set under different opening and closing sizes. The ASAP shows the uniformity and central brightness ratio of S-wave and P-wave under different opening and closing sizes regarding the modulated diaphragm sets. The difference between spatial uniformity of beams is remained within 11%.

Third Embodiment

Figure 5:
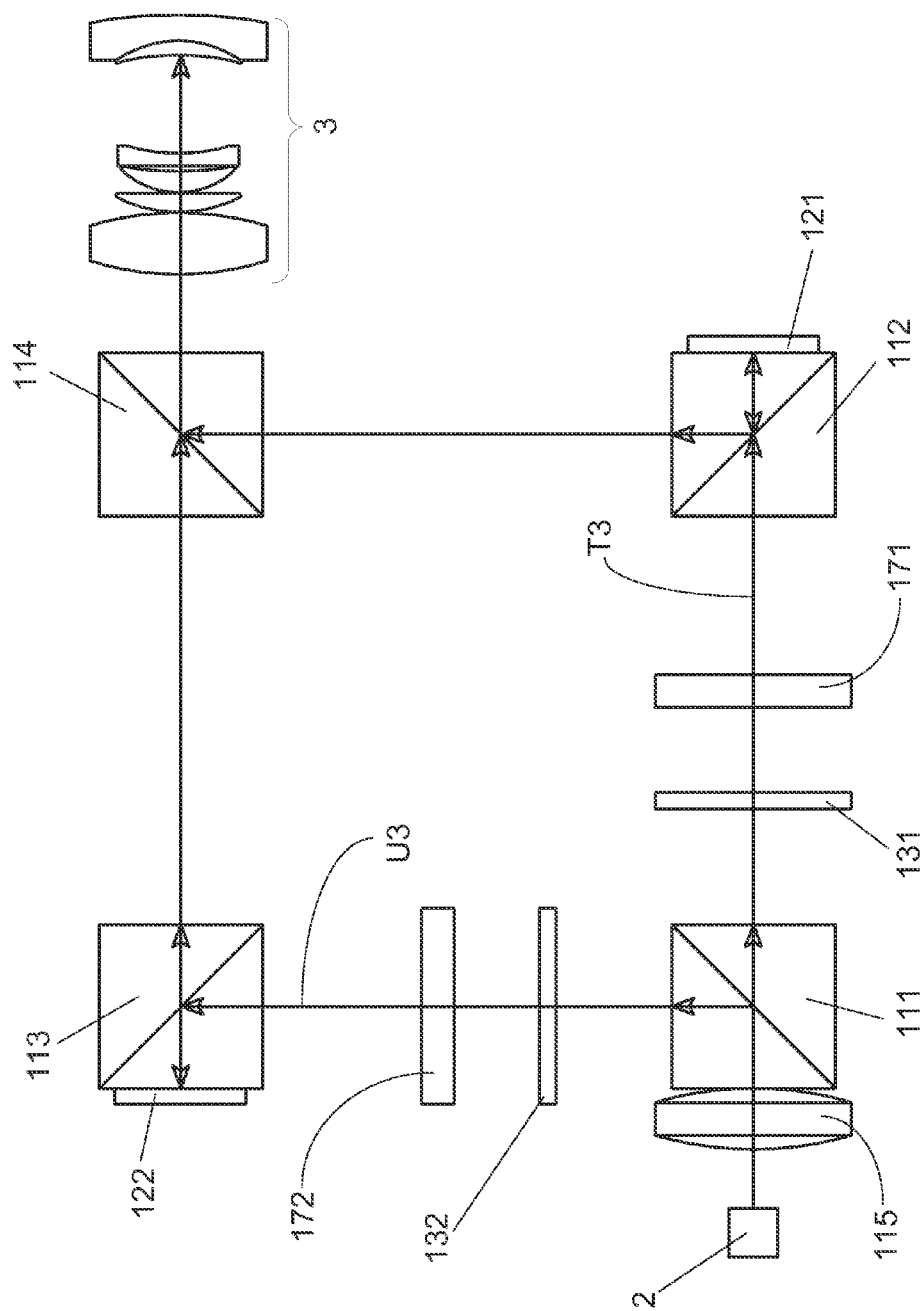
FIG. 5 is a projection device capable of effectively performing the light utilization according to a third embodiment of the invention.

To further effectively perform the light utilization, the invention can also utilize a beam polarized purification component such that the polarity of the polarized beam can be completely converted to enhance the light utilization. With reference to FIG. 5 for a projection device capable of effectively performing the light utilization according to a third embodiment of the invention is depicted. In the third embodiment, the main component and its installation are the same as the second embodiment. To prevent the polarized beam from being not-converted by the first polarized beam component 111 completely, two purification components are increased and include a first purification component 151 and a second purification component 152. The purification component is a polarized clean-up polarization plate, wherein the first purification component 151 is disposed between the first polarized beam component 111 and the second polarized beam component 112, and the second purification component 152 is disposed between the first polarized beam component 111 and the third polarized beam component 113.

In the third embodiment, the polarity conversion process and projection path of polarized beams are the same as the second embodiment. Only illumination path in the second embodiment further passes through the first purification component 151 and the second purification component 152. The following depiction is introduced with the illumination path of polarized beam according to the third embodiment of the invention.

When the non-polarized beam is irradiated to the first polarized beam component 111, the non-polarized beam is divided into a first polarized beam T3 and a second polarized beam U3. At this time, the first polarized beam T3 is remained with original beam path direction and concentrated at the second polarized beam component 112 through the first modulated diaphragm set 131 and the first purification component 151. Simultaneously, the second polarized beam U3 is concentrated at the third polarized beam component 113 along a direction that is vertical the original beam path and through the second modulated diaphragm set 132 and the second purification component 152.

In the illumination path of the second embodiment, after the first polarized beam T3 passes through the first purification component 151, it can be completely converted into S-wave. After the second polarized beam U3 passes through the second purification component 152, it can be completely converted into P-wave. Accordingly, the projection device capable of effectively performing the light utilization according to the invention can effectively perform the light utilization and enhance the efficiency of light utilization.

The foregoing depiction is clearly introduced with a projection device capable of effectively performing the light utilization according to the invention. By comparing with a conventional light source device of projection equipment, the projection device capable of effectively performing the light utilization according to the invention has the following advantages:

1. High light utilization efficiency: the projection device capable of effectively performing the light utilization of the invention enables a beam passing through at least three polarized beam components to completely convert it into S-wave or P-wave and utilizes the reflective components to control the polarization. The dispersing and attenuation of light can be reduced during the transmission process so as to increase the light utilization; and 2. Handle the brightness of different polarized beams: after the beam passes through the polarized beam components, the beam is divided into polarized beams with different paths. The invention is respectively disposed with a modulated diaphragm. The brightness of polarized beams is controlled by the modulated diaphragm to avoid the different brightness between two different path-polarized beams so as to prevent worse imaging quality.

The invention improves over the prior art and complies with patent application requirements, and thus is duly filed for patent application. While the invention has been described by device of specific embodiments, numerous modifications and variations could be made thereto by those generally skilled in the art without departing from the scope and spirit of the invention set forth in the claims.

What is claimed is:

1. A projection device capable of effectively performing the light utilization disposed between a light source 2 and a projection lens set 3, the projection device comprising:
    a first polarized beam component 111 for receiving a non-polarized beam provided by the light source 2;
    a first reflecting mirror 141 correspondingly disposed with the first polarized beam component 111;
    a second reflecting mirror 142 correspondingly disposed with the first polarized beam component 111, and the second reflecting mirror 142 diagonally disposed with the first reflecting mirror 141;
    a second polarized beam component 112 diagonally disposed with the first polarized beam component 111;
    a third polarized beam component 113 disposed to one side of the second polarized beam component 112, and the third polarized beam component 113 correspondingly disposed with the first reflecting mirror 141;
    a fourth polarized beam component 114 disposed to one side of the second polarized beam component 112, and the fourth polarized beam component 114 correspondingly disposed with the second reflecting mirror 142, and the fourth polarized beam component 114 diagonally disposed with the third polarized beam component 113;
    at least two reflective components comprising a first reflective component 121 and a second reflective component 122, wherein the first reflective component 121 is opposite to the first reflecting mirror 141, and disposed to one side of the third polarized beam component 113;
    and the second reflective component 122 is opposite to the second polarized beam component 112, and disposed to one side of the fourth polarized beam component 114; and
    at least two modulated diaphragm sets comprising a first modulated diaphragm set 131 and a second modulated diaphragm set 132, wherein the first modulated diaphragm set 131 is disposed between the first reflecting mirror 141 and the third polarized beam component 113, and the second modulated diaphragm set 132 is disposed between the second reflecting mirror 142 and the fourth polarized beam component 114;
    wherein when the non-polarized beam is irradiated to the first polarized beam component 111, the non-polarized beam is divided into a first polarized beam T1 and a second polarized beam U1 that are perpendicular to each other, so that, the first polarized beam T1 is remained with an original beam path direction and irradiated to the first reflecting mirror 141, and the second polarized beam U1 is reflected by the first polarized beam component 111 and irradiated to the second reflecting mirror 142 along a direction that is perpendicular to the original beam path direction;
    wherein the first polarized beam T1 irradiated to the first reflecting mirror 141 is reflected by the first reflecting mirror 141 and irradiated to the third polarized beam component 113 through the first modulated diaphragm set 131, and the second polarized beam U1 irradiated to the second reflecting mirror 142 is reflected by the second reflecting mirror 142 and irradiated to the fourth polarized beam component 114 through the second modulated diaphragm set 132;
    wherein the first polarized beam T1 irradiated to the third polarized beam component 113 directly passes through the third polarized beam component 113 and is irradiated to the first reflective component 121, thus, the first reflective component 121 changes a polarity of the first polarized beam T1 and reflects the first polarized beam T1 back to the third polarized beam component 113, such that, the first polarized beam T1 is reflected by the third polarized beam component 113 and irradiated to the second polarized beam component 112;
    wherein the second polarized beam U1 irradiated to the fourth polarized beam component 114 is reflected by the fourth polarized beam component 114 and irradiated to the second reflective component 122, thus, the second reflective component 122 changes a polarity of the second polarized beam U1 and reflects the second polarized beam U1 back to the fourth polarized beam component 114, such that, the second polarized beam U1 directly passes through the fourth polarized beam component 114 and is irradiated to the second polarized beam component 112;
    wherein the first polarized beam T1 irradiated to the second polarized beam component 112 is reflected by the second polarized beam component 112, and the second polarized beam U1 irradiated to the second polarized beam component 112 directly passes through the second polarized beam component 112, such that, the first polarized beam T1 and the second polarized beam U1 are converged together and irradiated to the projection lens set 3, then an image is able to be displayed by the projection lens set 3.

2. The projection device capable of effectively performing the light utilization as recited in claim 1, wherein the first polarized beam component 111, the second polarized beam component 112, the third polarized beam component 113, and the fourth polarized beam component 114 are a polarizing beam splitter (PBS).

3. The projection device capable of effectively performing the light utilization as recited in claim 1, wherein the reflective component is selected from the group consisting of a reflective liquid crystal micro-display having liquid crystal on silicon and a micro-reflector light valve.

4. The projection device capable of effectively performing the light utilization as recited in claim 1, wherein the modulated diaphragm set is able to adjust luminous flux of the polarized beam.

5. The projection device capable of effectively performing the light utilization as recited in claim 1, further comprising:
    a first lens set 151 disposed between the first polarized beam component 111 and the light source 2;
    a second lens set 152 disposed between the first polarized beam component 111 and the first reflecting mirror 141;
    a third lens set 153 disposed between the first polarized beam component 111 and the second reflecting mirror 142;

a fourth lens set 154 disposed between the first reflecting mirror 141 and the third polarized beam component 113;

a fifth lens set 155 disposed between the second reflecting mirror 142 and the fourth polarized beam component 114;

a sixth lens set 156 disposed between the third polarized beam component 113 and the first reflective component 121; and a seventh lens set 157 disposed between the fourth polarized beam component 114 and the second reflective component 122.

6. A projection device capable of effectively performing the light utilization disposed between a light source 2 and a projection lens set 3, the projection device comprising:

a first polarized beam component 111 for receiving a non-polarized beam provided by the light source 2;

a second polarized beam component 112 correspondingly disposed with the first polarized beam component 111;

a third polarized beam component 113 correspondingly disposed with the first polarized beam component 111, the third polarized beam component 113 diagonally disposed with the second polarized beam component 112;

a fourth polarized beam component 114 correspondingly disposed with the second polarized beam component 112 and the third polarized beam component 113;

at least two reflective components comprising a first reflective component 121 and a second reflective component 122, wherein the first reflective component 121 is disposed to one side of the second polarized beam component 112, and the second reflective component 122 is disposed to one side of the third polarized beam component 113; and at least two modulated diaphragm sets comprising a first modulated diaphragm set 131 and a second modulated diaphragm set 132, wherein the first modulated diaphragm set 131 is disposed between the first polarized beam component 111 and the second polarized beam component 112, and the second modulated diaphragm set 132 is disposed between the first polarized beam component 111 and the third polarized beam component 113;

wherein when the non-polarized beam is irradiated to the first polarized beam component 111, the non-polarized beam is divided into a first polarized beam T2 and a second polarized beam U2 that are perpendicular to each other, and the first polarized beam T2 is remained with an original beam path direction and irradiated to the second polarized beam component 112 through the first modulated diaphragm set 131, and the second polarized beam U2 is irradiated to the third polarized beam component 113 along a direction that is perpendicular to the original beam path direction and through the second modulated diaphragm set 132;

wherein the first polarized beam T2 irradiated to the second polarized beam component 112 directly passes through the second polarized beam component 112 and is irradiated to the first reflective component 121, thus the first reflective component 121 changes a polarity of the first polarized beam T2 and reflects the first polarized beam T2 back to the second polarized beam component 112, such that the second polarized beam component 112 reflects the first polarized beam T2, and the first polarized beam T2 is irradiated to the fourth polarized beam component 114;

wherein the second polarized beam U2 irradiated to the third polarized beam component 113 is reflected by the third polarized beam component 113 and irradiated to the second reflective component 122, thus the second reflective component 122 reflects the second polarized beam U2 and changes a polarity of the second polarized beam U2, such that the second polarized beam U2 passes through the third polarized beam component 113 to irradiate to the fourth polarized beam component 114;

wherein the first polarized beam T2 irradiated to the fourth polarized beam component 114 is reflected by the fourth polarized beam component 114, and the second polarized beam U2 irradiated to the fourth polarized beam component 114 directly passes through the fourth polarized beam component 114, so that, the first polarized beam T2 and the second polarized beam U2 are converged together and irradiated to the projection lens set 3, then an image displayed by the projection lens set 3.

7. The projection device capable of effectively performing the light utilization as recited in claim 6, wherein the first polarized beam component 111, the second polarized beam component 112, the third polarized beam component 113, and the fourth polarized beam component 114 are a polarizing beam splitter (PBS).

8. The projection device capable of effectively performing the light utilization as recited in claim 6, further comprising:

an incident lens 115 disposed between the first polarized beam component 111 and the light source 2;

an eighth lens set 161 disposed between the first polarized beam component 111 and the second polarized beam component 112;

a ninth lens set 162 disposed between the first polarized beam component 111 and the third polarized beam component 113;

a tenth lens set 163 disposed between the second polarized beam component 112 and the fourth polarized beam component 114; and an eleventh lens set 164 disposed between the third polarized beam component 113 and the fourth polarized beam component 114.

9. The projection device capable of effectively performing the light utilization as recited in claim 8, the first modulated diaphragm set 131 is disposed at proper position between the eighth lens set 161.

10. The projection device capable of effectively performing the light utilization as recited in claim 8, wherein the second modulated diaphragm set 132 is disposed at proper position between the ninth lens set 162.

11. The projection device capable of effectively performing the light utilization as recited in claim 6, wherein the reflective component is selected from the group consisting of a reflective liquid crystal micro-display having liquid crystal on silicon and a micro-reflector light valve.

12. The projection device capable of effectively performing the light utilization as recited in claim 6, wherein the modulated diaphragm set is able to adjust luminous flux of the polarized beam.

13. The projection device capable of effectively performing the light utilization as recited in claim 6, further comprising:

at least two purification components comprising a first purification component 171 and a second purification component 172, wherein the first purification component 171 is disposed between the first polarized beam component 111 and the second polarized beam component 112, and the second purification component 172 is disposed between the first polarized beam component 111 and the third polarized beam component 113.

14. The projection device capable of effectively performing the light utilization as recited in claim 13, wherein the first polarized beam T1 is completely converted into S-wave after passing through the first purification component 171.

15. The projection device capable of effectively performing the light utilization as recited in claim 13, wherein the second polarized beam U1 is completely converted into P-wave after passing through the second purification component 172.

16. The projection device capable of effectively performing the light utilization as recited in claim 13, wherein the first purification component 171 and the second purification component 172 are a polarized clean-up polarization plate.

* * * * *